June 30, 1942. M. FORMAN 2,288,080
METHOD OF PREPARING DRYING STICKS FOR SAUSAGE CASINGS
Filed April 17, 1939
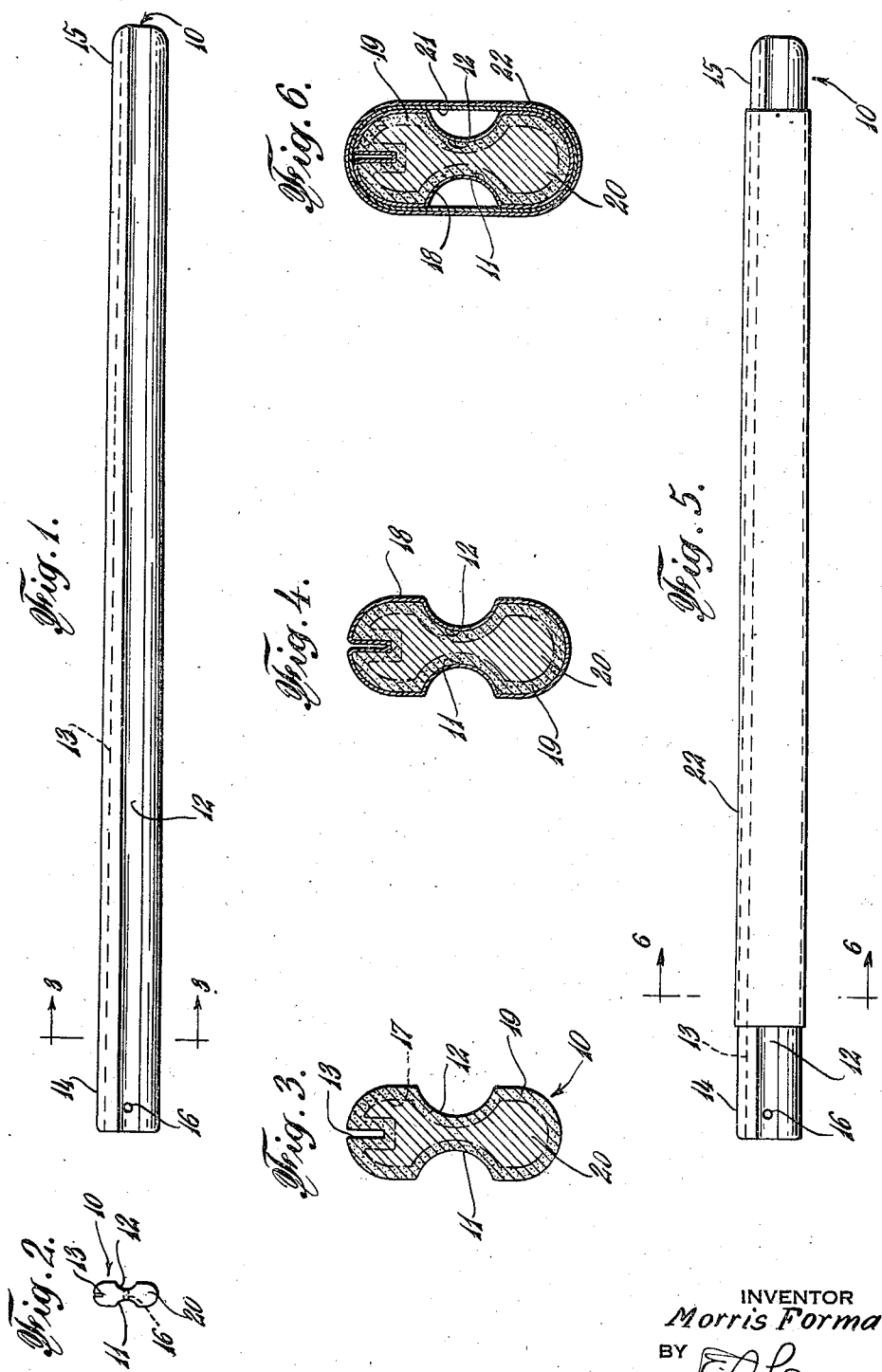
INVENTOR
Morris Forman
BY
ATTORNEY Patented June 30, 1942

2,288,080

UNITED STATES PATENT OFFICE 2,288,080

METHOD OF PREPARING DRYING STICKS FOR SAUSAGE CASINGS

Morris Forman, Brooklyn, N. Y.

Application April 17, 1939, Serial No. 268,329

2 Claims. (Cl. 117—59)

This invention relates to a process of preparing sausage casings, and in particular pertains to casing drying sticks adapted for employment in such process.

In the conventional method of preparing sausage casings or bungs, especially of the type formed from hog and beef intestines, one or two of such tubular casings are slipped over an elongated drying stick, usually composed of wood, and suspended in a suitable drying chamber for a period of between ten to thirty-six hours, depending upon the materials employed, conditions and general requirements; and thereafter the single or double casing is removed from the stick by first slitting it longitudinally and then peeling it off. The sheet of casing material is then in condition to be sewed to another sheet to form a suitable tubular container for receiving therein a selected filling.

It has always been found that in the performance of this process the casing material, after the drying process has been completed, adheres to the stick rather firmly,—making it necessary to carefully perform the peeling operation, as aforesaid. And upon an examination of the sheet of casing material after its removal from the drying stick, it is generally found that there are areas of varied and uneven thicknesses, some portions having greater translucency than others; and as a result of such differences in the light-transmitting properties of different portions of the casing, the finished sausage presents a very spotty and unsightly appearance. This condition has caused considerable sales resistance, inasmuch as purchasers of an edible article of this nature naturally prefer a sausage of uniform color, and are disinclined to purchase sausages containing what appears to the eye to be discolorations. It is hence primarily within the contemplation of my invention to eliminate this shortcoming by enabling sausages of the above-mentioned class to be prepared whereby the finished product will be of substantially even color and appearance—an objective which I accomplish by providing a method of producing sausage casings of uniform thickness and hence of substantially unvarying light-transmitting properties throughout the extent thereof.

Another object of this invention is to facilitate the removal of a sausage casing from a drying stick after the completion of the drying operation.

And it is within the further contemplation of my invention to enable the above-mentioned objectives to be obtained in a simple and economical manner.

Other objects, features and advantages will appear from the drawing and description hereinafter given.

Referring to the drawing:

Figure 1 is an elevation of a drying stick adapted for use with the process of my invention, the stick being shown before being treated.

Figure 2 is an end view of Figure 1.

Figure 3 is a section of Figure 1 taken along line 3—3 thereof, illustrating semi-diagrammatically the condition of the stick after one step in the process of my invention has been completed.

Figure 4 is a view similar to Figure 3 showing the condition of the stick after the completion of another step.

Figure 5 is an elevation of a drying stick prepared according to the process of my invention, showing a casing placed thereover, and Figure 6 is a section of Figure 5 taken along line 6—6.

In the drawing, the drying stick 10 is shown in its untreated state, and containing two oppositely disposed lateral recessed portions 11 and 12 extending longitudinally along the stick to permit aeration of the skin or casing operatively placed thereover during the drying process. Extending longitudinally along the stick is the slot 13 adapted to guide a knife edge employed in slitting the casing operatively positioned on the stick after the drying operation,—in well-known and conventional manner. Due to the fact that the natural casing gradually and progressively tapers down from the region of maximum thickness and diameter towards the opposite terminal thereof, the stick 10 is also made of slightly tapered proportions, being somewhat larger at the terminal portion 14 thereof than at the opposite portion 15 thereof. The stick is also provided preferably with an aperture 16 thereof to enable it to be suspended from a suitable nail or other supporting element in the drying chamber.

In most known methods of treating sausage casings, drying sticks of the above-mentioned category are generally made of wood as that has been found most suitable for the purpose. Due to the porosity of the stick, it is known to absorb large quantities of the fatty ingredients of the casing during the drying process. In fact, after such sticks have been used for several treatments, they are found to have a decidedly obnoxious odor. Apparently, the absorption of the fatty or other casing impurities is quite thorough, inasmuch as an examination of a broken stick that had been used a number of times will reveal rather extensive penetration of the absorbed substances. And when a sausage casing is operatively exposed to a stick in this condition in the drying chamber where temperature and atmospheric conditions constitute factors enhancing evaporation, the absorbed materials embedded within the stick are subjected to this influence and in their vaporized form leave the stick and impregnate the surrounding casing tissues. This not only imparts an ill-smelling odor to the casing, but obviously renders it unsanitary and at times unsuitable as an edible substance. And as aforesaid, after the casing is removed from the stick, it is found that the tissue is of uneven thickness throughout the extent thereof, indicating that certain areas thereof have been thinned out during the process of drying the casing and its removal from the stick. While it is not definitely known as to what are the precise contributing factors producing these thinned-out areas, it is thought that this may be caused by an eating away of such areas due to either chemical or bacterial action under the atmospheric conditions in the drying chamber. It is also thought that this condition may be attributed in part to the process of peeling the casing from the stick after the drying process, particularly where there is a rather firm adhesion between the stick and the casing effected by the mucilaginous properties of the fatty or other substances exuded by the stick or casing. Obviously, the detaching operation might result in a tearing or mutilation of some of the casing tissues, with a consequent thinning-out of such areas.

To overcome these undesirable conditions, I employ a stick produced by the process of this invention which completely eliminates the disadvantages above-referred to. By my invention I impart to the stick such properties that prevent its absorption of the fatty or other impurities of the sausage casing, and that will also eliminate the possibility of the stick imparting any of its own impurities to the casing during the drying operation; and by eliminating the factors causing an adhesion of the casing to the stick, I obviate the possibility of mutilation of the casing from this factor.

Specifically, I select a stick 19 of predetermined porous properties, and immerse it into a preferably saline solution of boiling water and keep it soaking therein preferably for a period of two hours. I find that this not only removes all natural impurities particularly in the region of the lateral surface of the wood, but also renders it receptive for the next step. Thereafter, the stick is immediately inserted in a bath of hot liquid paraffin, preferably although not necessarily in the neighborhood of its boiling point. I have found that for the best results the period of immersion in paraffin is approximately six hours, although both longer and shorter periods, as well as moisture repellant substances other than the paraffin, may be employed with satisfactory results. The stick is then removed from the paraffin bath and held vertically for a predetermined period of time, preferably one-half an hour, to permit the melted paraffin to flow down and off the stick. In this condition the stick has absorbed through the pores and crevices thereof which were cleaned and opened by the saline bath, a certain quantity of paraffin, the extent of penetration being dependent upon the nature of the wood and other conditions. By referring to Figure 3, the dot-dash line 17 represents diagrammatically the inner boundary of penetration of the paraffin. In this condition the outer surface of the stick is practically uncoated with any of the paraffin, inasmuch as it had run off while still in a highly liquid state. The stick is then immersed in a bath of relatively cool, yet liquid paraffin, the temperature being sufficient to permit an adhesion of a layer 18 of paraffin to the outer surface of the stick when it is exposed to the atmosphere. The stick is now ready for use.

By employing the stick prepared in the manner aforesaid, it will be found that a casing dried upon this stick will be clean, sanitary and of even thickness throughout the extent thereof. The peripheral portion 19 (see Fig. 3) of the stick containing the absorbed paraffin serves as an absolute barrier against the emission of any injurious vapors or impurities that may be present within the central portion 20 of the stick, during the drying operation; and in like manner there will obviously be no absorption of any of the vaporized fatty substances of the outer casings 21 or 22 surrounding the stick. Likewise, the paraffin coating 18 on the outer surface of the stick will serve as a further factor in preventing the passage therepast of any such impurities or vapors. And should any portion of the outer coating 18 be scraped off or otherwise removed from the stick, it is apparent that the inner and unexposed paraffin portion 19 thereof will serve as a further barrier to the passage of such impurities to and from the body of the stick. And it is also obvious that in view of the properties of the outer coating 18 and the smoothness of its surface, there will be practically no adhesion whatsoever between the casing 21 and the stick 10. Hence every known factor that contributes to a mutilation and a thinning out of regions of the casing has been eliminated by means of my invention.

I have found that by using my process and the stick above-described constituting my invention, sausage casings either of single or double thickness can be subjected to a drying process without the usual damage to the body of the casing; and that furthermore the casing could more readily be removed than in the conventional process. The uniform thickness of the casings treated by my process and dried upon the aforesaid treated stick give the finished product an even appearance, devoid of all unsightly, spotty areas and discolorations prevalent in sausages prepared by conventional methods.

It is of course understood that other additional forms of drying stick apparatus and adaptations of the process can be employed beyond and in addition to those hereinabove described, all within the scope of the appended claims.

What I claim is:

1. In a method of preparing a stick for use in a process of drying sausage casings in a heated drying chamber, the steps of selecting an elongated stick of porous wood adapted to receive thereover the casing to be dried, soaking the stick in a bath of hot brine to cleanse the pores and crevices of the stick in the region of the outer lateral portion thereof, immersing the cleansed stick in a hot bath of liquid paraffin for a period of time sufficient to enable said pores and crevices to absorb a portion of the paraffin, removing the stick from the paraffin bath and supporting it vertically in the atmosphere to permit the excess liquid paraffin on the outer surface to drain off and the absorbed paraffin within the stick to solidify, and coating the lateral surface of the stick with an outer layer of paraffin to coact with the paraffin embedded in the stick to prevent the impregnation thereof with vapors exuded from the casing under the influence of the heat in the drying chamber, and to prevent the dried casing from adhering to the stick whereby it may readily be removed.

2. In a method of preparing a stick for use in a process of drying sausage casings, the steps of selecting an elongated stick of porous wood adapted to receive thereover the casing to be dried, soaking the stick in a boiling aqueous saline solution to cleanse the pores and crevices of the stick in the region of the outer lateral portion thereof, immersing the cleansed stick in a hot bath of liquid paraffin to enable said pores and crevices to absorb a portion of the paraffin, removing the stick from the paraffin bath and supporting it vertically in the atmosphere to permit the excess liquid paraffin on the outer surface to drain off and the absorbed paraffin to solidify within the stick to form an inner paraffin layer, dipping the stick into a relatively cool liquid bath of paraffin of a temperature sufficiently low to permit the paraffin adhering to the stick to form a solid outer coating thereupon upon exposure to the atmosphere, and withdrawing the stick into the atmosphere to effect a formation of said coating.

MORRIS FORMAN.